United States Patent [19]
Rodriguez, Jr.

[11] Patent Number: 5,826,962
[45] Date of Patent: Oct. 27, 1998

[54] LCD INTEGRATED/OVERHEAD PROJECTOR

[75] Inventor: Ernesto M. Rodriguez, Jr., Roundrock, Minn.

[73] Assignee: Minnesota Mining and Manufacturing Company, St. Paul, Minn.

[21] Appl. No.: 846,434

[22] Filed: Apr. 30, 1997

[51] Int. Cl.$^6$ .................................................. G03B 21/14
[52] U.S. Cl. ............................................ 353/82; 353/119
[58] Field of Search .................................. 353/71, 82, 83, 353/89, 90, 93, 119, 30; 359/6

[56] References Cited

U.S. PATENT DOCUMENTS

| | | | |
|---|---|---|---|
| 3,922,079 | 11/1975 | Astero | 353/63 |
| 4,595,266 | 6/1986 | Kramer | 353/94 |
| 5,231,434 | 7/1993 | Kennedy et al. | 353/119 |
| 5,321,450 | 6/1994 | Shapiro et al. | 353/119 |
| 5,428,415 | 6/1995 | Keelan et al. | 353/82 |
| 5,461,437 | 10/1995 | Tanaka | 353/71 |
| 5,632,546 | 5/1997 | Lee | 353/82 |

*Primary Examiner*—William Dowling
*Attorney, Agent, or Firm*—Matthew B. McNutt

[57] ABSTRACT

A projector includes a housing having a single light projection source. A first condenser projects a first light beam from the light source, through an LCD image display screen mounted in the housing, and to a projection surface. A second condenser projects a second beam of light from the light source, to an overhead projector mounted on the housing, and to the projection surface. A beam blocking device is connected to the housing for movement into a position for selectively blocking the second beam of light.

20 Claims, 5 Drawing Sheets

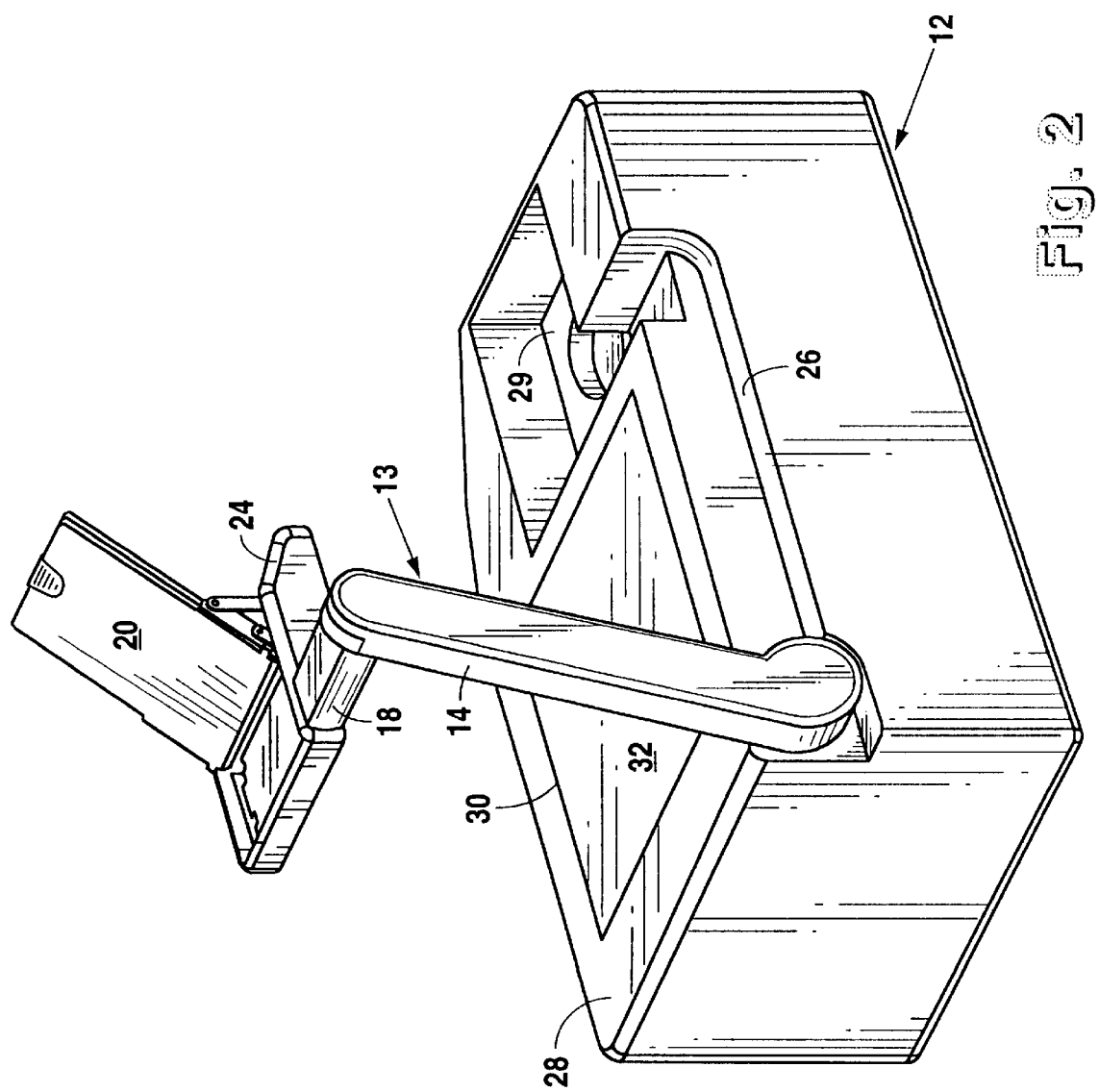

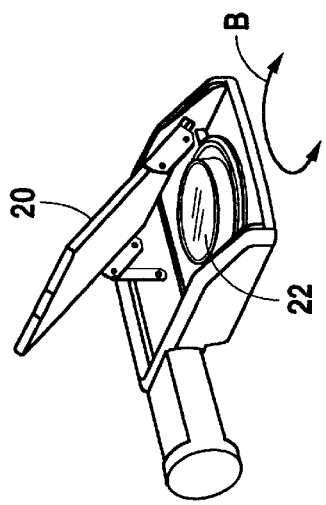
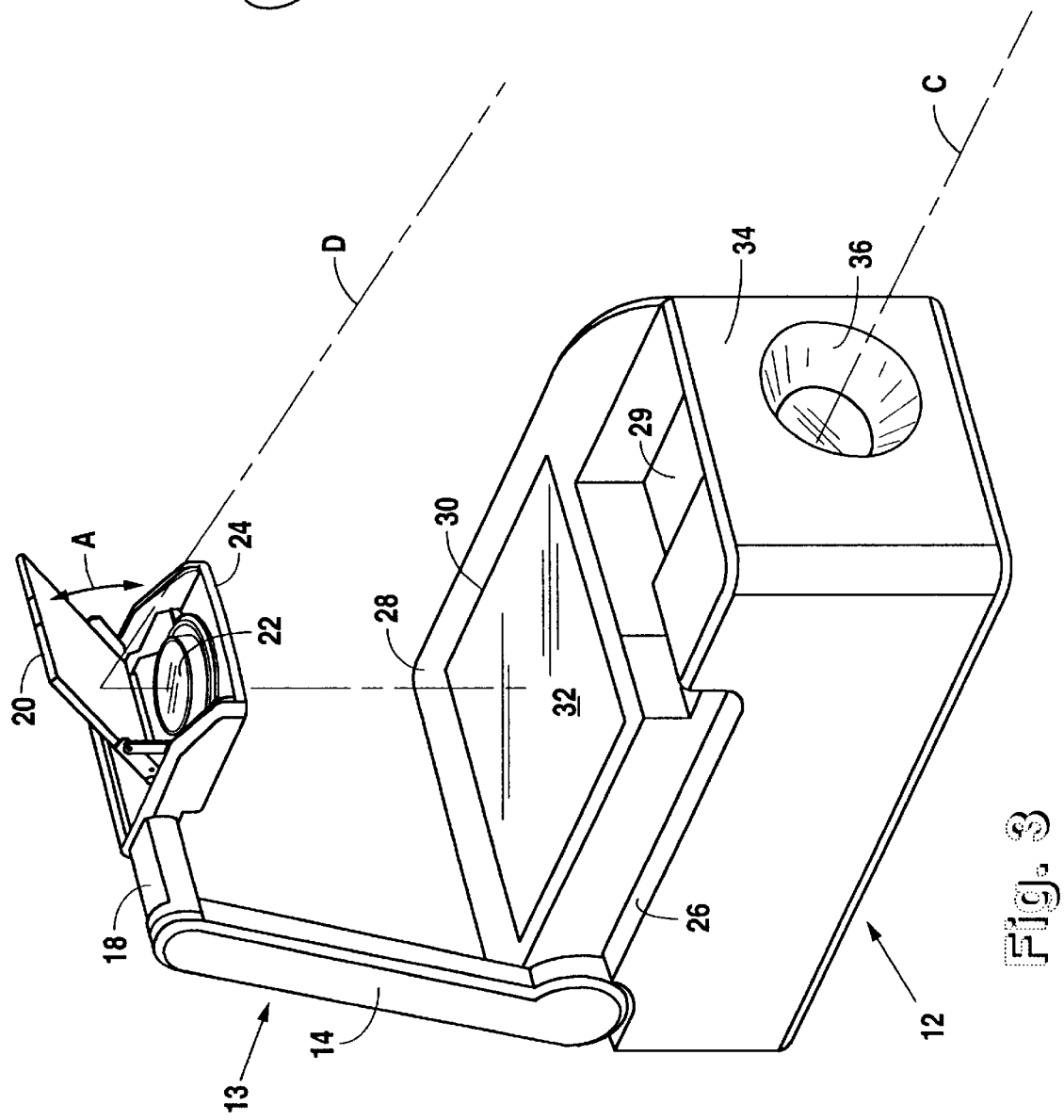

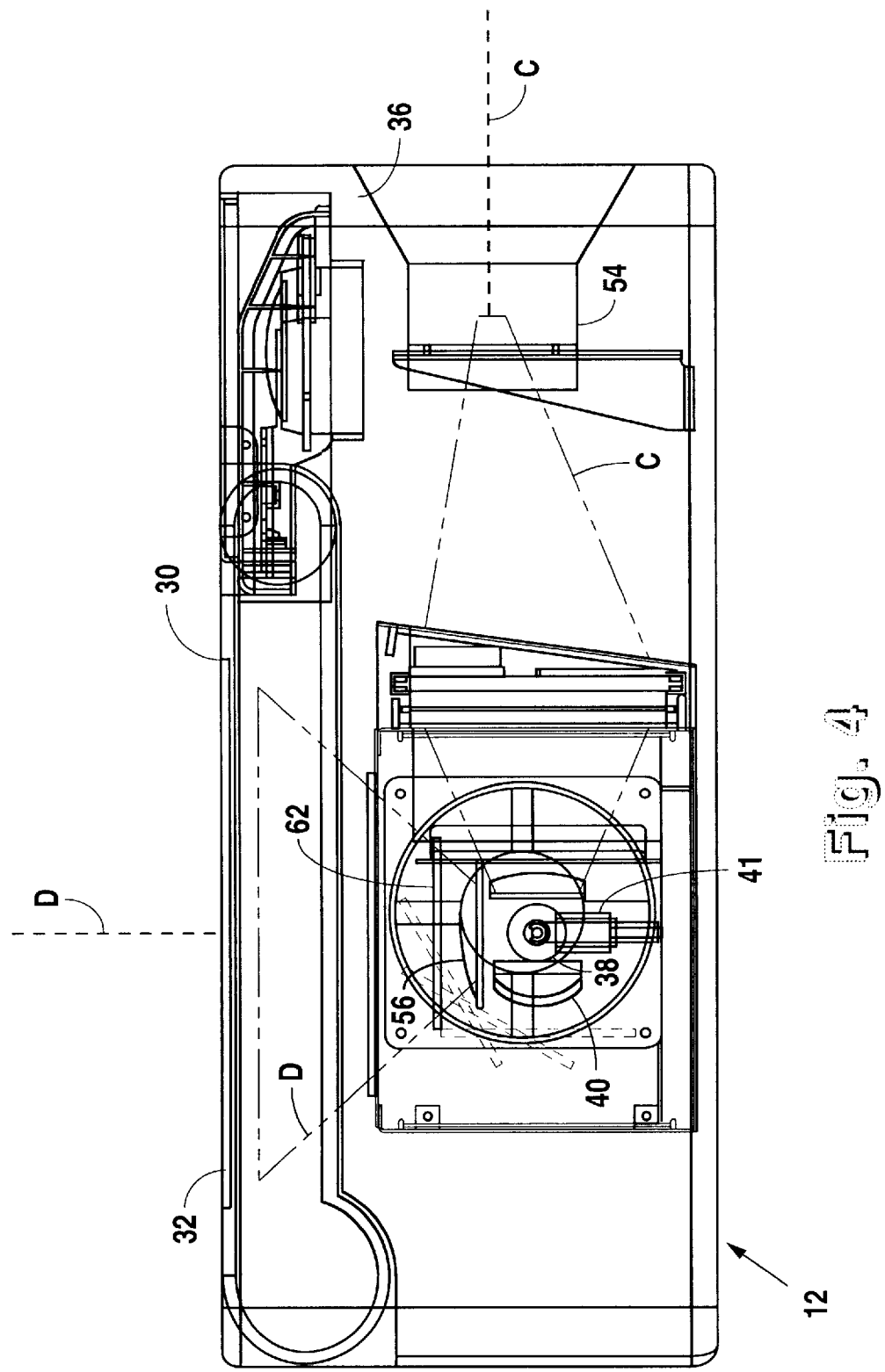

LCD INTEGRATED/OVERHEAD PROJECTOR

BACKGROUND OF THE INVENTION

The disclosures herein relate generally to a method and apparatus for providing a projector system and more particularly to combining a liquid crystal display (LCD) integrated/overhead projector system which may be used as an integrated projector only, an overhead projector only, or may use both systems simultaneously.

Various projector devices have been developed for use as overhead projectors and more recently have made use of an LCD panel. One such device describes a series of projectors designed to project images from a number of sources. One embodiment discloses a projector having a transparency projector, apparently suitable for 35 mm slides, an episcope-type projector (an episcope projector being one intended for the projection of an opaque original) and a television screen. The television screen is projected through the same optical system as is intended for projection of the opaque objects. Two separate light sources are used, and the television screen is self-luminous. It is expected that the projected image of the opaque object, and of the television screen will be very dim, as this is the nature of images projected from both these objects. A second embodiment discloses a system to accomplish a similar goal to the above except that the slide projector is configured to project through the same optical system as the opaque projection and the television screen projection. Again several light sources are used, and the television screen is self-luminous. Yet another embodiment discloses a system whereby a transparency projector, a episcope projector and a television screen are integrated into a single unit. In this embodiment, two light sources and a self-luminous television screen are used to generate a variety of images, each from a separate original. All of the above tend to be limited by final image brightness and require independent light sources. In addition, the electronic signal is reproduced by means of a television screen which generates light rather than merely modulating it. It should be noted that the conventional television screen is incapable of modify light incident on the surface thereof, and indeed incident light causes apparent visual degradation of the television screen, as may be seen if an attempt is made to view a television screen in bright light, for example in sunlight.

Another device discloses a projector designed to achieve what is known as "lap-dissolve" projection. The latter is a technique for improving the continuity or smoothness of a presentation by arranging that as one image fades from the screen, a second rises in intensity, in the same time frame, so that when the first image has totally vanished, the second image is being projected at full power. There are many ways to achieve this objective, varying in their mechanical complexity and therefor in the number of separate components that must be used. One embodiment has a single light source and a single projection lens. Two physically-separated object planes (transparencies or slides) are provided, plus a sliding mirror positionable so as to be able to direct light from the source to one object plane or the other at will. No provision is made for electronic image projection, and no provision is made for changing an image during projection by, for example, writing on the surface of a transparency with a suitable marker.

Overhead projectors have been known for many years as presentation and teaching tools. One such device discloses an overhead projector having an automatic lamp changer feature. When a lamp fails during use, a device in the projector detects the failure, removes the failed lamp and moves a second lamp into the position previously occupied by the failed lamp. Minimal interruption of the presentation results. A more recent overhead projector folds for compact storage. Among other recent developments in the field of overhead projectors is the LCD panel. This is a device used in conjunction with an overhead projector, that is placed on the horizontal stage of the projector, and which is connected to a computer. It is able to function as video display device. Another device discloses a laptop computer with a detachable display which can then be placed on an overhead projector to make a computer-based presentation.

More recently, devices generally referred to as integrated or electronic projectors have become commercially available. Devices of this type are disclosed using a folded optical system which passes light through an LCD panel (a transmissive panel). Another device uses a reflective LCD panel, sometimes referred to as a liquid crystal light valve. Such devices have great utility for making computer based presentations, but one limitation of the devices is a difficulty for the presenter of interacting with the projected display. This feature of interacting with the display is considered one of the advantages of the overhead projector, where it is simple to use a pointer while facing the audience and not moving from the podium. Also, presentation techniques such as image revelation are more easily done with an overhead projector.

Therefore what is needed is a method and apparatus providing a combined LCD integrated, overhead projector system which allows use of the system as an integrated projector only, as an overhead projector only or may use both systems simultaneously wherein both systems share a single lamp source and utilize their own optical components without articulation.

SUMMARY OF THE INVENTION

One embodiment, accordingly, provide a method and apparatus for providing a combined LCD integrated overhead projector system. To this end a projector includes a housing having a single light projection source. A first condenser projects a first light beam from the light source, through an LCD image display screen mounted in the housing, and to a projector surface. A second condenser projects a second beam of light from the light source, to an overhead projector mounted on the housing, and to the projector surface. A beam blocking device is connected to the housing for movement into a position for selectively blocking the second beam of light.

A principal advantage of this embodiment is that it provides a projector system which is used as an integrated projector only, as an overhead projector only or uses both systems simultaneously wherein both systems share a single lamp source. The user has the ability to annotate on the overhead projector simultaneously while running a data or video presentation on the LCD projector.

BRIEF DESCRIPTION OF THE DRAWINGS

FIG. 2 is an isometric view illustrating an embodiment of the projector with the overhead projector arm in an extended position.

FIG. 3 is another isometric view illustrating an embodiment of the projector with the overhead projector arm in an extended position.

FIG. 3a is a partial isometric view illustrating an embodiment of the projection mirror and lens portions of the overhead projector.

FIG. 4 is a side view schematically illustrating components of the projector mounted in the housing.

DESCRIPTION OF THE PREFERRED EMBODIMENT

Figure 1:
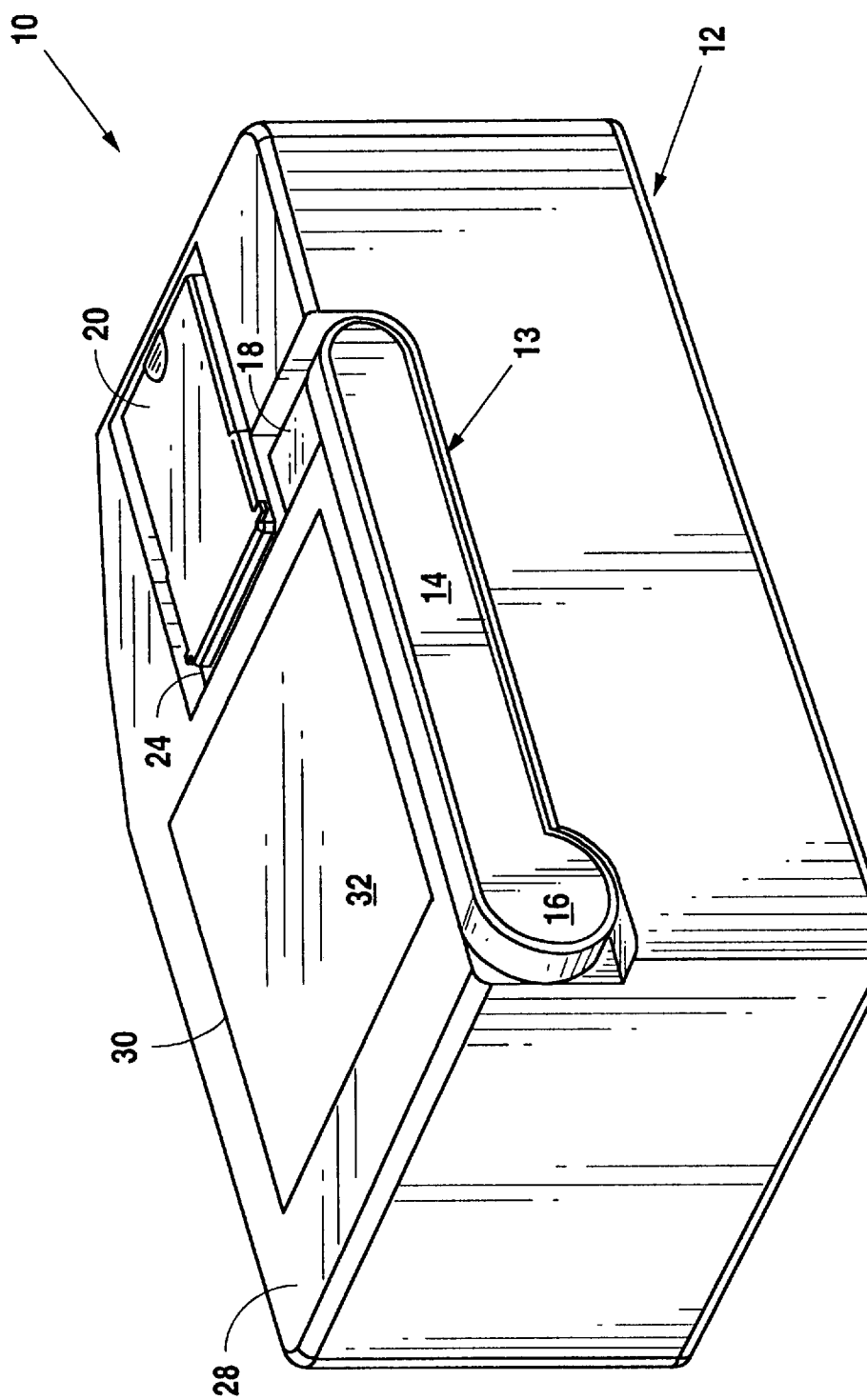
FIG. 1 is an isometric view illustrating an embodiment of the projector with the overhead projector arm in a collapsed position.

Referring to FIG. 1, a projector is generally designated 10 and is in a housing 12 formed of a suitable plastic material. An overhead projector member 13 includes projector arm 14 formed of a suitable material and pivotally attached to housing 12 at a pivotal connection 16 for moving arm 14 between a collapsed position, FIG. 1, and an extended position, FIG. 2. A distal end 18 of arm 14 includes a projection mirror 20 and a projection lens 22, FIGS. 2 and 3, mounted in a support 24. Mirror 20 is pivotally mounted in support 24 for movement in directions indicated by the arrow designated A. Also, mirror 20 is mounted for rotating movement in support 24, FIG. 3a, in directions indicated by the arrow designated B.

A recess 26, FIGS. 2 and 3, is formed in a surface 28 of housing 12 for receiving arm 14 and a recess 29, integratedly formed with recess 26 is also formed in surface 28 of housing 12 for receiving support 24 including mirror 20 and lens 22. It can be seen in FIG. 1, that when arm 14 is in the collapsed position, arm 14, including mirror 20 is flush with surface 28. Also in surface 28, FIGS. 1, 2 and 3, a light beam exit port 30 is provided in a stage portion of housing 12 covered by a suitable smooth planar glass member 32. Another surface 34, FIG. 3, of housing 12 includes another light beam exit port 36.

Figure 5:
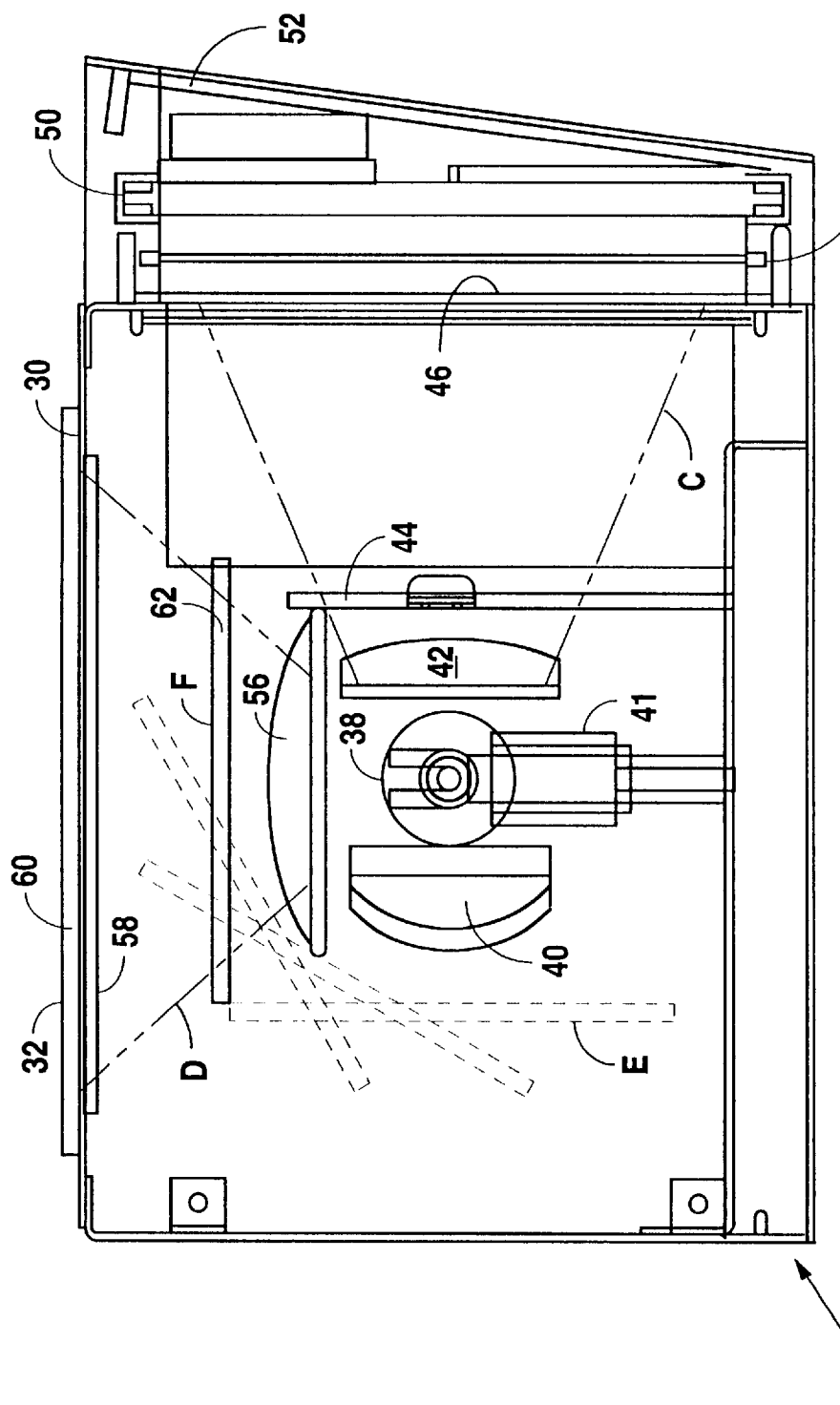
FIG. 5 is a partial side view schematically illustrating components of the projector.

Projector 10 is an LCD integrated overhead projector as is schematically illustrated in FIGS. 4 and 5. Within housing 12, a light source 38 is mounted and is preferably a 575 watt metal halide lamp mounted in a socket 41. Lamp 38 provides a single light source for projecting a first light beam to exit port 30 and a second light beam to exit port 36 as will be discussed below A reflector 40 is mounted adjacent to and on one side of lamp 38, FIG. 5. Immediately adjacent lamp 38 and on another side, opposite reflector 40, is a condenser 42 which collects light reflected by reflector 40 and passes a diverging light beam designated C through an infrared filter 44 to a lampside fresnel lens 46. The light beam C is collimated by fresnel lens 46 and passes through a polarizer 48, an LCD image display screen 50 and a projection side fresnel lens 52 which converges light beam C toward a projector lens 54, FIG. 4, which magnifies and diverges light beam C out of housing 12 via exit port 36 and onto a suitable projection surface (not shown).

A light beam D, from lamp 38 is also collected by another adjacent condenser 56 which passes diverging light beam D through another infrared filter 58 and a fresnel lens 60 which converges light beam D out of housing 12 via exit port 30 and through planar glass member 32 toward projection lens 22, FIG. 3, projection mirror 20, and onto the same projection surface as light beam C.

A movable shutter member 62, FIG. 5, or other light blocking means, is movably mounted in housing 12 and functions as a means for blocking light beam D from projecting to overhead projector member 13. Shutter member 62 is appropriately provided to manually be pivoted from a first non-light blocking position E adjacent reflector 40, to a second position F, immediately adjacent condenser 56, so as to block light beam D from exiting port 30.

Lamp 38 gives out a substantial amount of light, much more than a typical tungsten halogen lamp, commonly used on overhead projectors. The output of light beam C is about 500 lumens. The output of light beam D is about 4000–5000 lumens.

In operation, when it is desired to use projector 10 for an LCD presentation only, a personal computer, for example, may be connected to communicate display directly to LCD image display screen 50 in a manner well known. The image thus communicated to screen 50 is projected onto the projection surface by light beam C. In this operational mode, shutter member 62 is moved to position F so as to block light beam D from projecting to overhead projector 13. When it is desired to use projector 10 for a combined LCD and overhead presentation, shutter member 62 is moved to position E thus permitting light beam D to also project onto the projection surface. The images on the projection surface from the LCD display screen 50 may be enhanced by transparencies placed on the stage at exit port 30. Also, by moving the position of mirror 20, the projection of light beam D may be moved on the projection surface relative to the projection of light beam C so that, for example, a simultaneous side-by-side presentation may be made. When it is desired to use projector 10 for an overhead presentation only, shutter member 62 is positioned in position E thus permitting light beam D to project onto the projection surface. However, no display signal is input into LCD display screen 50 and therefore the only images projected onto the projection surface are those generated from the stage at exit port 30 via light beam D.

The embodiment described herein is an improvement to previous devices in that it utilizes only one light source which can power one or both optical systems modes, the first using a transmissive LCD panel, and configured as an integrated projector, and the second a projector similar to an overhead projector. The first mode is able to project onto a screen an image from a video or computer source, while the second mode can project a conventional overhead transparency. These modes can be employed independently at the choice of the presenter, or they may be used together in an overlay so that the presenter is able to point to feature on the video display or use colored overlays, or other tools to enhance the clarity of the presentation. By the adjustment of the overhead projector, it would be possible to display the overhead projector image displaced from the video image. Two nominally unrelated images could then be placed adjacent to one another for comparison purposes.

Although illustrative embodiments have been shown and described, a wide range of modifications, change and substitution is contemplated in the foregoing disclosure and in some instances, some features of the embodiments may be employed without a corresonding use of other features. Accordingly, it is appropriate that the appended claims be construed broadly and in a manner consistent with the scope of the embodiments disclosed herein.

What is claimed is:

1. A projector comprising:
   a housing;
   a light source mounted in the housing;
   first condenser means for projecting a first light beam from the light source, through an LCD image display screen mounted in the housing, and to a projection surface; and
   second condenser means for simultaneously projecting a second beam of light from the light source, to an overhead projector mounted on the housing, and to the projection surface.

2. The projector as defined in claim 1 wherein the housing includes an overhead projector arm pivotally attached thereto.

3. The projector as defined in claim 2 wherein the projector arm includes a projection lens and mirror attached to an end thereof.

4. The projector as defined in claim 3 wherein the housing includes recesses formed therein for receiving the projector arm and the projection lens and mirror.

5. The projector as defined in claim 3 wherein the projection lens and mirror are movably connected to the projector arm.

6. The projector as defined in claim 1 wherein the first condenser means is mounted on a first side of the light source and a reflector is mounted on a second side of the light source, opposite the first side.

7. The projector as defined in claim 1 wherein the light source has a socket on one side thereof and the second condenser means is mounted adjacent the light source on another side thereof opposite the one side.

8. The projector as defined in claim 1 wherein the housing has a first light beam exit port and a second light beam exit port.

9. The projector as defined in claim 8 wherein the first light beam exit port is provided in a first surface of the housing and the second light beam exit port is provided in a second surface of the housing which extends substantially perpendicular to the first surface.

10. The projector as defined in claim 9 further including means connected to the housing and movable to a position for selectively blocking the second beam of light, the means for blocking the second beam of light, being movable to a position between the second condenser means and the second light beam exit port.

11. The projector as defined in claim 8 wherein the first light beam passes from the first condenser means and sequentially through an infrared filter, a first fresnel lens, a polarizer, the LCD image display screen, a second fresnel lens and a projection lens.

12. The projector as defined in claim 8 wherein the second light beam passes from the second condenser means and sequentially through an infrared filter, a fresnel lens and a planar stage glass member.

13. The projector as defined in claim 1 wherein the light source is a metal halide lamp.

14. The projector as defined in claim 3 wherein the projector arm including the projection lens and mirror, pivot into recesses formed in a surface of the housing for flush mounting with respect to the surface.

15. The projector as defined in claim 8 wherein the first light beam exits the first exit port for projection to the projection surface.

16. The projector as defined in claim 15 wherein the second light beam exits the second exit port for projection sequentially to a projection lens, a projection mirror and the projection surface.

17. The projector as defined in claim 1 wherein the first light beam is a reflected beam projected from the housing in a first direction directly to the projection surface and the second light beam is projected from the housing to the overhead projector in a second direction substantially normal to the first direction.

18. The projector as defined in claim 8 wherein the first exit port directs the first beam in a first direction and the second exit port directs the second beam in a second direction different from the first direction.

19. An LCD integrated overhead projector comprising:
a housing;
a light source mounted in the housing;
a reflector mounted adjacent the light source;
first condenser means for projecting a first light beam reflected from the light source by the reflector, the first light beam being projected to exit the housing in a first direction through a means for collimating the beam, through an LCD image display screen mounted in the housing and to a projection surface;
second condenser means for projecting a second beam of light from the light source, the second beam being projected to exit the housing in a second direction substantially normal to the first direction through a means for collimating the beam, to an overhead projector mounted on the housing and to the projection surface; and
means connected to the housing and movable to a position for selectively blocking the second beam of light from projecting to the overhead projector.

20. A method of providing an LCD integrated overhead projector comprising the steps of:
mounting a light source in a housing;
projecting a first light beam from the light source to exit the housing through an LCD image display screen mounted in the housing and to a projection surface;
projecting a second light beam from the light source to exit the housing to an overhead projector mounted on the housing, and to the projection surface; and
moving a beam blocking device mounted within the housing for selectively blocking the second light beam from exiting the housing.

* * * * *